United States Patent

Schäfer et al.

[11] Patent Number: 5,139,345
[45] Date of Patent: Aug. 18, 1992

[54] TEMPERATURE SENSOR FOR MIXING AND KNEADING MACHINES

[75] Inventors: Manfred Schäfer, Schwieberdingen; Friedhelm Mueller, Freudenberg; Ulrich Wolf, Siegen, all of Fed. Rep. of Germany

[73] Assignee: Werner & Pfleiderer GmbH, Stuttgart, Fed. Rep. of Germany

[21] Appl. No.: 681,755

[22] Filed: Apr. 8, 1991

[30] Foreign Application Priority Data

May 4, 1990 [DE] Fed. Rep. of Germany ....... 4014361

[51] Int. Cl.⁵ ............................................. G01K 07/06
[52] U.S. Cl. ................................. 374/179; 374/208; 374/141
[58] Field of Search .............. 374/139, 141, 147, 158, 374/179, 190, 208; 366/142; 136/230, 232, 233

[56] References Cited

U.S. PATENT DOCUMENTS

| | | | |
|---|---|---|---|
| 3,516,873 | 6/1970 | Bonkowski et al. | 136/230 X |
| 3,679,490 | 7/1972 | Finkbiner | 374/139 X |
| 3,713,339 | 1/1973 | Medlar | 374/141 X |
| 4,376,227 | 3/1983 | Hilborn | 136/230 X |
| 4,605,172 | 8/1986 | Ahlert | 366/142 X |
| 4,776,705 | 10/1988 | Najjar et al. | 374/139 |
| 4,830,515 | 5/1989 | Cortes | 374/208 |
| 4,871,263 | 10/1989 | Wilson | 136/232 X |
| 4,904,091 | 2/1990 | Ward | 374/141 X |
| 4,963,194 | 10/1990 | Mele | 374/208 X |
| 4,984,904 | 1/1991 | Nakano et al. | 136/232 X |

Primary Examiner—William A. Cuchlinski, Jr.
Assistant Examiner—G. Bradley Bennett
Attorney, Agent, or Firm—Ladas & Parry

[57] ABSTRACT

A temperature sensor for mixing and kneading vessels, particularly for rubber kneaders, which is sealingly mounted in an opening in a housing wall of the vessel to project into the material to be mixed and/or kneaded. A thermocouple is mounted in the measurement tip for transducing measured temperature into signals transferred to a measurement device. The measurement tip comprises a thin-walled tube of relatively large diameter made of high-strength low heat-conductivity material. The tube has a conical portion at the tip end of which is mounted a high heat-conductivity material connected to the thermocouple. The outer surface of tube is coated with an insulation layer of ceramic at least in the region in which the tube is engaged in the housing wall.

18 Claims, 1 Drawing Sheet

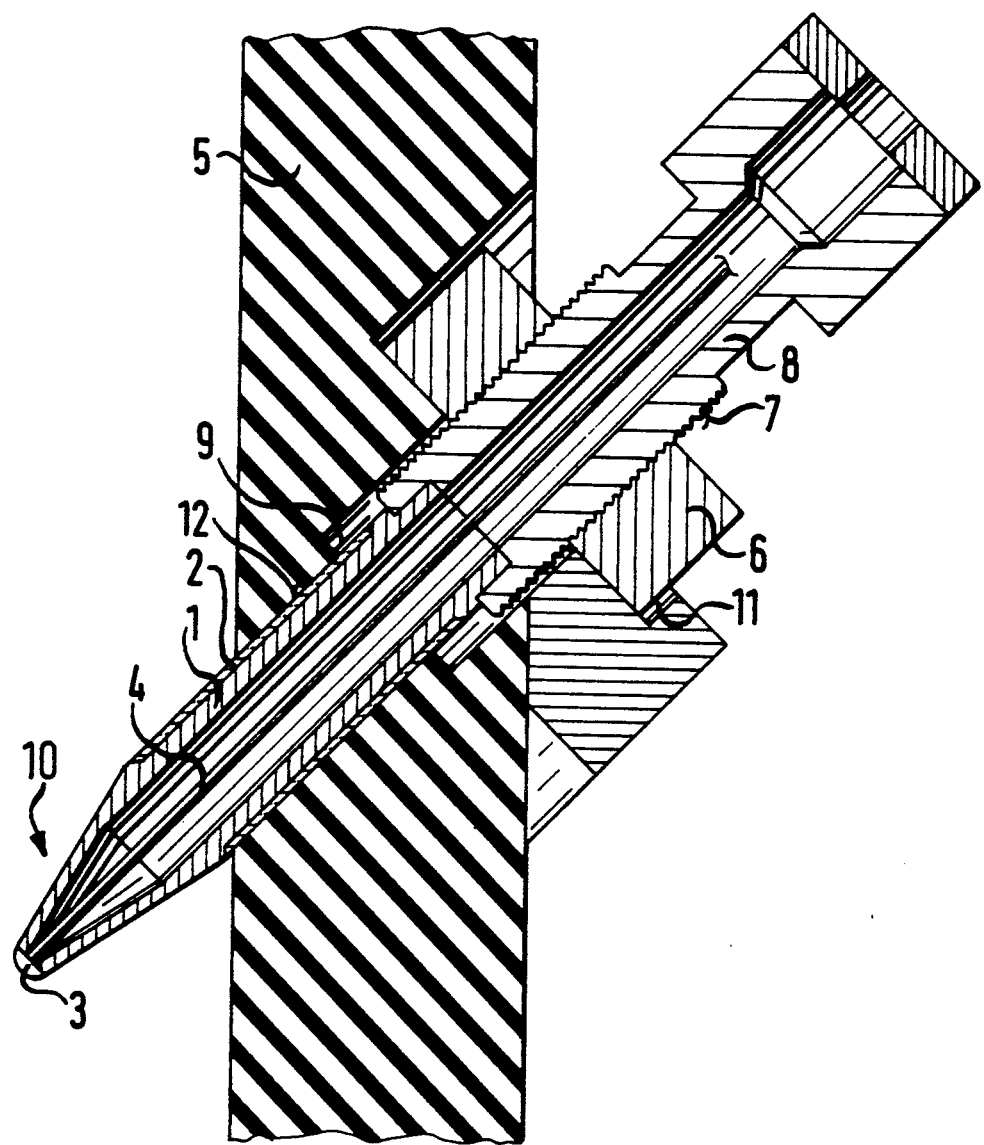

TEMPERATURE SENSOR FOR MIXING AND KNEADING MACHINES

FIELD OF THE INVENTION

The invention relates to a temperature sensor or probe for use in mixing and kneading machines.

BACKGROUND AND PRIOR ART

The exact determination of product temperature in mixing and kneading machines is of increasing importance due to progressive automation and to the processing of temperature sensitive products.

The temperature sensors currently utilized in practice in mixing and kneading machines have a measurement error of 10 to 20% or more and consist of a number of individual parts. Due to severe operational conditions and the high mechanical stresses in mixing and kneading tanks, temperature sensors must be made very stable particularly at the measurement tip which is immersed in the mixed material. Temperature sensors therefore are utilized either with or without measurement tips that are insulated with respect to the sensor housing.

In the case of non-insulated measurement tips, there is a high transfer of heat from the measurement tip to the housing and in this way there arises a relatively large measurement error.

In the case of insulated measurement tips, many individual parts are necessary. The measurement tip only has a shallow immersion depth, since it can only be relatively small with respect to the sensor housing, due to the insulation necessary between the measurement tip and the sensor housing. The shallow immersion depth and thus the small wetted surface of the measurement tip causes measurement errors.

A temperature sensor for rubber kneaders equipped with insulated measurement tips is described in DE - GM 19 35 219. The measurement tip (measurement value sensor) is surrounded by one or more elements having a low heat conductivity and by two receiving bushings. In addition, an elastic gasket, a pressure unit, and a receiving shaft are necessary to complete the construction of the temperature sensor. In addition to the large number of individual components, which imposes a high cost of manufacture and assembly for such temperature sensors, the necessary pressure sealing is for the most part not obtained or not obtained permanently.

SUMMARY OF THE INVENTION

An object of the invention is to provide a temperature sensor of the above type, which has a measurement error of less than 5%, is mechanically stable, and is designed to be pressure sealed, while only consisting of a few individual components.

The above and further objects of the invention are satisfied by a construction of the temperature sensor which comprises a tubular body of low heat conductive material having a conical portion with a tip at which a body of high heat conductivity is mounted. A thermocouple extends in the hollow body and is connected to said body of high heat conductivity. A heat insulating layer is on the tubular body for insulating the sensor when it is installed in a wall of a mixing and kneading tank. This construction provides a high mechanical rigidity with a simultaneous decrease in the thermal mass. In this way a dynamic improvement of the response behavior is obtained with a simultaneous improvement in the measurement accuracy. Thermal decoupling between the measurement tip and the housing wall is obtained by the insulating layer while According to one embodiment of the invention, the tubular body is made of case hardened steel and the insulating layer is zirconium oxide. This is an advantageous combination of materials, since zirconium oxide possesses a low heat conductivity, is resistant to corrosion, and has an expansion coefficient, which is approximately that of steel.

A further stabilization of the measurement tip is produced with a simultaneous reduction in the heat dissipation if the tubular body is made of a titanium alloy.

If the high heat conductivity body is made from copper, good sensing and transfer of the respective product temperature is obtained. Special configurations for specific purposes for increasing the operational service life of the measurement tip can be obtained when the total surface of the tubular body which comes into contact with the melt product is coated with a high wear resistant coating.

BRIEF DESCRIPTION OF THE FIGURE OF THE DRAWING

The sole figure of the drawing is a longitudinal section through one embodiment of a temperature sensor according to the invention.

DETAILED DESCRIPTION

The drawing shows a temperature sensor in a mounted state in a housing wall 5 of a rubber kneader. Only a portion of the wall is shown and the remainder of the kneader is not illustrated as it is not germane to the invention. The temperature sensor comprises an attachment sleeve or bushing 8 provided with an outer threaded surface 7. A measurement tip 10 is inserted in and secured to bushing 8 by welding or by a threaded connection (not shown). The measurement tip 10 extends in axial prolongation of bushing 8.

The attachment of the temperature sensor to the wall 5 is carried out by means of a suitable fastening attachment at a joint 11 arranged around an opening 9 in the wall 5. The immersion depth of measurement tip 10 in the material (not shown) within the wall 5 of the kneader is adjustable by means of an adjustment ring 6 engaged on the outer threads 7 on bushing 8. Ring 6 is connected to joint 11 such that the ring is rotatable while being axially fixed. Therefore, when the ring 6 is rotated, the measurement tip 10 is longitudinally adjusted.

For purposes of a light weight design, measurement tip 10 consists of a thin-walled tube 1 of high-strength, low thermal conductivity material. In order to obtain a high rigidity and good wettability, tube 1 has a relatively large diameter. This diameter approximately corresponds to the diameter of the bore 12 in housing wall 5 in which the measurement tip is inserted so that when the wall of tube 1 of measurement tip 10 is placed in bore 12 it will be tightly sealed therein.

A body 3 of high thermal conductivity material is mounted at the tip end of the conical portion of tube 1 and is connected to a thermocouple 4 which extends in the tube to a measurement means (not shown). Copper or other high conductivity material (preferably applied by vacuum deposition) can be utilized as the material for body 3.

The conical portion of tube 1 is open at its tip end and the thermocouple snugly fits in the opening. The body 3 is disposed on the tip end of the tube 1 to close the opening thereat and make contact with the thermocouple. The body 3 is formed to smoothly merge in the contour of tube 1 and not provide any protuberant or projecting surfaces.

For thermal insulation at housing wall 5, tube 1 is covered with an insulating layer 2 of ceramic material. Preferably this is a zirconium oxide layer which is plasma deposited on tube 1 of high-strength case-hardened steel. In order to increase the operational service life of the measurement tip 10, the entire surface of tube 1 which comes into contact with the product whose temperature is to be measured, and thus is subjected to high load, is coated with a high wear-resistant material such as tungsten carbide. The wear-resistant layer can also be made of ceramic protective layers, which are applied by vacuum technology.

A further optimization of the measurement values may be obtained by making the tube 1 of a titanium alloy which has a heat conductivity value that is lower than that of steel by a factor of 4.

The temperature sensor according to the invention can be produced very simply since it is composed of only a few components. The ceramics which are plasma deposited, the copper and the wear-resistant layers produce an intimate and tight connection with the base material (tube 1), which had previously not been coated in this manner. A further advantage of the tight, integrated construction of the invention results from the considerably improved pressure sealing that is obtained thereby in the housing wall.

Although the invention has been described with reference to specific embodiments thereof, it will become apparent to those skilled in the art that numerous modifications and variations can be made within the scope and spirit of the invention as defined in the attached claims.

What is claimed is:

1. A temperature sensor for a mixing and kneading tank in which a sensor is pressure sealed in an opening in a wall of the tank, said sensor comprising a hollow tubular body of low heat conductivity material, said body including a cylindrical portion and a conical portion extending from said cylindrical portion, said conical portion having an end with a small opening at a tip of said tubular body, said tubular body having a relatively thin wall compared to the diameter of the tubular body to form a cavity in the tubular body, a body of high heat conductivity at said opening to close the tip of the tubular body, a thermocouple connected to said body of high heat conductivity and extending in said cavity in spaced relation from the material of said tubular body, a heat-insulating layer on said tubular body for insulating the sensor in the wall of the tank, a sleeve fixed to said tubular body in axial prolongation thereof and means engaging said sleeve and said wall for adjusting the longitudinal position of said tubular body and thereby of said sensor.

2. A sensor as claimed in claim 1, wherein said tubular body is made of case hardened steel.

3. A sensor as claimed in claim 2, wherein said heat insulating layer is a ceramic.

4. A sensor as claimed in claim 3, wherein said ceramic is plasma-deposited zirconium oxide.

5. A sensor as claimed in claim 1, wherein said tubular body is made of a titanium alloy.

6. A sensor as claimed in claim 1, wherein said body of high heat conductivity is copper.

7. A sensor as claimed in claim 6, wherein said body of high heat conductivity is in the form of a plasma deposited coating.

8. A sensor as claimed in claim 2, wherein said body of high heat conductivity is copper.

9. A sensor as claimed in claim 3, wherein said body of high heat conductivity is copper.

10. A sensor as claimed in claim 4, wherein said body of high heat conductivity is copper.

11. A sensor as claimed in claim 1, comprising a wear-resistant coating on said body of high heat conductivity.

12. A sensor as claimed in claim 1, wherein said means for adjusting the longitudinal position of said body comprises a displaceable member engaging said sleeve to move the sleeve and said body therewith when the displaceable member is moved.

13. A sensor as claimed in claim 12, wherein said displaceable member comprises an adjustment ring threadably engaged with said sleeve and engaged by to said wall for rotation while being longitudinally fixed.

14. A sensor as claimed in claim 1, wherein said thermocouple is snugly fitted in said opening, said body of high heat conductivity being on said tip to close said opening and make contact with said thermocouple.

15. A sensor as claimed in claim 14, wherein said body of high heat conductivity is a plasma-deposited coating of copper.

16. A sensor as claimed in claim 1, wherein said body of high heat conductivity is fitted at said opening in said conical portion and is shaped to smoothly merge with the contour of the conical portion.

17. A sensor as claimed in claim 1, wherein said tubular body extends through said wall at an acute angle.

18. A sensor as claimed in claim 1, wherein said cylindrical portion of said tubular body is tightly engaged in the opening in the wall of the tank in pressure sealed relation.

* * * * *